United States Patent
Fredrickson et al.

(10) Patent No.: US 6,470,474 B1
(45) Date of Patent: Oct. 22, 2002

(54) METHOD AND APPARATUS FOR IDENTIFYING ERRORS IN A DETECTED SEQUENCE OF VALUES

(75) Inventors: Lisa Fredrickson, Seattle, WA (US); Vladimir Kovner, Simi Valley, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/397,941

(22) Filed: Sep. 17, 1999

(Under 37 CFR 1.47)

Related U.S. Application Data (60) Provisional application No. 60/101,324, filed on Sep. 22, 1998.

(51) Int. Cl.[7] .............................................. H03M 13/03
(52) U.S. Cl. ......................... 714/794; 360/53; 360/65; 375/341; 375/262; 375/263; 375/350; 714/795
(58) Field of Search ............................. 341/59; 360/48, 360/46, 40, 49, 53, 65, 51, 77.06, 77.04; 375/355, 290, 341, 363, 262, 350, 340; 714/814, 792, 794, 795, 799, 801; 706/902; 342/151, 152; 329/316, 341, 345

(56) References Cited

U.S. PATENT DOCUMENTS

| | | | | |
|---|---|---|---|---|
| 5,521,945 A | * | 5/1996 | Knudson ...................... | 360/65 |
| 5,691,857 A | * | 11/1997 | Fitzpatrick et al. ......... | 360/77.06 |
| 5,781,699 A | * | 7/1998 | Dittmar et al. ............... | 706/13 |
| 5,835,541 A | * | 11/1998 | Namekata et al. ............ | 375/355 |
| 6,243,847 B1 | * | 6/2001 | McClellan et al. ........... | 714/799 |

OTHER PUBLICATIONS

Wood (Turbo–PRML: A Compromise EPRML Detector; IEEE; 1993).*
Friedman et al. (Simplified EPR4 detection; IEEE; on pp.: 129–134; Sep. 8–10, 1997).*
Yinyi Lin et al. (Study of an extended partial–response, class IV, channel for digital magnetic recording; IEEE; on pp.: 4392–4404; Sep. 1997).*
Eleftheriou, et al. (Improving performance of PRML/EPRML through noise prediction; IEEE; on pp.: 3968–3970; Sep. 1996).*

(List continued on next page.)

*Primary Examiner*—Albert Decady
*Assistant Examiner*—Guy Lamarre
(74) *Attorney, Agent, or Firm*—Theodore M. Magee; Westman, Champlin & Kelly, P.A.

(57) ABSTRACT

A method and apparatus are provided for identifying errors in a detected sequence of values generates the detected sequence of values from channel samples using a detector designed for a channel with a first channel response characteristic. The detected sequence of values is filtered using a filter that emulates a second channel response characteristic to produce a sequence of simulated second channel samples. The channel samples provided to the detector are also provided to a second filter which emulates a response characteristic equal to the second channel response characteristic divided by the first channel response characteristic. This produces a sequence of actual second channel samples. A sequence of difference values is then generated by subtracting each of the simulated second channel samples from a corresponding actual second channel sample. Using the sequence of difference values, at least one error is identified in the detected sequence of values.

21 Claims, 5 Drawing Sheets

OTHER PUBLICATIONS

Nishiya, et al. (PERD: partial error response detection; IEEE; on pp.: 3042–3044; Nov.. 1995).*

Kim, et al. (Equalizer and detector performance in digital VCRs IEEE; on pp.: 582–586; Jun. 1996).*

"A Class of Partial Response Systems for Increasing Storage Density in Magnetic Recording", H. Thapar and A. Patel, IEEE Trans. Magn., vol. MAG–23, No. 5, pp. 3666–3668 (Sep. 1987).

"Analysis of Error Sequence for PRML and EPRML Signaling Performed Over Lorentzian Channel", R. Karabed et al., Globecom 96, (IEEE Global Telecommunications Conference 96) pp. 368–373.

"Turbo–PRML: A Compromise EPRML Detector," by R. Wood, IEEE Trans. on Magnetics, vol. 29, No. 6, pp. 4018–4020 (Nov. 1993).

* cited by examiner

METHOD AND APPARATUS FOR IDENTIFYING ERRORS IN A DETECTED SEQUENCE OF VALUES

REFERENCE TO RELATED APPLICATIONS

The present application claims priority from a U.S. Provisional Application having Ser. No. 60/101,324, filed on Sep. 22, 1998 and entitled "SUPPLEMENTAL POSTPROCESSOR FOR CONSTRAINED STATE DETECTOR."

BACKGROUND OF THE INVENTION

The present invention relates to encoding data for transmission through a channel and for decoding such encoded data after its transmission through a channel. In particular, the present invention relates to encoders and decoders in communication systems for information storage and retrieval.

Information that is transmitted from a source to a destination can be considered generically to pass through a channel. In some communication systems, the channel comprises electromagnetic radiation passing through the atmosphere. In other communication systems, the channel comprises a long conductor between the source and destination. Still other communication systems comprise a magnetic disk, where information from the source is stored on the disk and later retrieved from the disk for delivery to the destination.

In early storage systems, an analog read signal was generated from the disk and converted into digital data by assuming that a current digital value was unaffected by its predecessor values in the read signal. Later systems recognized that the writing and reading operations could be modeled as a communication channel and that this communication channel exhibited certain partial response characteristics in which neighboring values in the channel affected each other.

Using this channel model, many current systems utilize a Partial Response Maximum Likelihood (PRML) approach when attempting to detect and decode data read from a storage medium. Under PRML, a read signal is generated from the medium and sampled to produce a sequence of samples. These samples are then passed through a filter to fit the samples to a desired channel response. A detector then determines the most likely data sequence given the sequence of samples.

Typically, storage systems have channel responses of the form $(1-D)(1+D)^n$, where D represents a delay of one time period and n is the order of the target that approximates the channel response. When n=2, the channel response is known as EPR4 and when n=3, the channel response is known as $E^2PR4$ (also written as EEPR4). Expanding the basic equation above for each value of n produces target polynomials for each channel response of:

$$H_{EPR4}(D)=1+D-D^2-D^3 \quad \text{EQ. 1}$$

and $$H_{EEPR4}(D)=1+2D-2D^3-D^4 \quad \text{EQ. 2}$$

where D is a delay of one sampling period, $D^2$ is a delay of two sampling periods, $D^3$ is a delay of three sampling periods, and $D^4$ is a delay of four sampling periods. Thus, in an EPR4 channel, the current channel output sample is the sum of a current input bit and the previous input bit, minus the second and third previous input bits. In an $E^2PR4$ channel, the current channel output sample is the sum of a current input bit and two times the previous input bit minus two times the third previous input bit and minus the fourth previous input bit.

Because the EPR4 channel response involves the past three channel bits D, $D^2$, and $D^3$, there are eight possible states at each time period in the detector. Thus, an EPR4 channel requires an eight-state viterbi detector, which exist at the present time.

Because the eight-state Viterbi detector exists, most existing storage devices have an EPR4 target channel response. However, it has been shown that such channels suffer from single-bit error events defined as a single bit difference between the sequence of bits provided to the transmission channel and the sequence of bits estimated by the EPR4 detector.

One theoretical solution for removing these single-bit error events is to change the channel response to an $E^2PR4$ response. Theoretically, this should remove the single-bit error because this error event generates a squared distance of 10, $d^2=10$, in an $E^2PR4$ channel compared to a squared distance of 4, $d^2=4$, in the EPR4 channel. Such an increase in the squared distance generally makes it easier to detect the error in an $E^2PR4$ channel than in an EPR4 channel.

Although this may work in theory, it is extremely difficult to implement because an $E^2PR4$ detector is a sixteen-state machine that is significantly more complex than the eight-state machine of the EPR4 detector. In addition, the equalization strategy, timing and gain recovery associated with an $E^2PR4$ channel is much more complex than the corresponding processes in an EPR4 channel. Thus, a detection system is needed that avoids the single-bit error of the EPR4 channel without adding the complexity of an $E^2PR4$ channel.

SUMMARY OF THE INVENTION

A method for identifying errors in a detected sequence of values generates the detected sequence of values from channel samples using a detector designed for a channel with a first channel response characteristic. The detected sequence of values is filtered using a filter that emulates a second channel response characteristic to produce a sequence of simulated second channel samples. The channel samples provided to the detector are also provided to a second filter which emulates a response characteristic equal to the second channel response characteristic divided by the first channel response characteristic. This produces a sequence of actual second channel samples. A sequence of difference values is then generated by subtracting each of the simulated second channel samples from a corresponding actual second channel sample. Using the sequence of difference values, at least one error is identified in the detected sequence of values.

An apparatus under the present invention provides a detector capable of detecting a preliminary sequence of values from samples taken from a first channel's output. A second channel filter is coupled to the detector and is capable of generating a sequence of simulated second channel samples from the preliminary sequence of values. A sequence of actual second channel samples is created from the samples at the first channel's output by an equalizer filter that has a partial response characteristic such that the combined partial response characteristic of the first channel and the equalizer filter is equal to the partial response characteristic of the second channel filter. A difference circuit receives both the actual and simulated second channel values and produces a sequence of difference values by subtracting each simulated second channel value from a corresponding actual second channel value. A verification circuit then identifies errors in the preliminary sequence of values based on the sequence of difference values.

DETAILED DESCRIPTION OF ILLUSTRATIVE EMBODIMENTS

Figure 1:
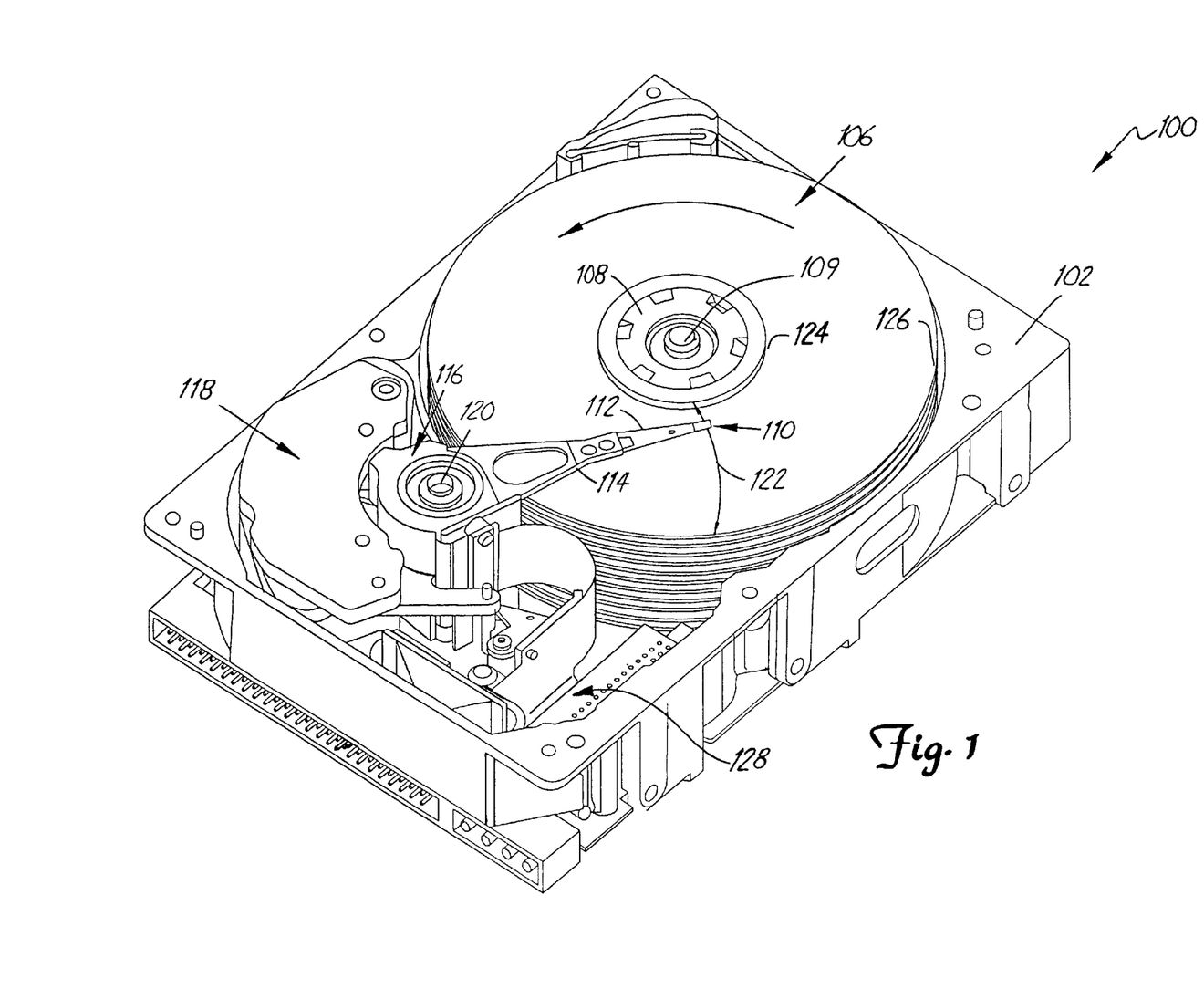
FIG. 1 is a block diagram of a data storage system in which one embodiment of the invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated head 110, which is mounted to disc drive 100 for communication with the disc surface. In the example shown in FIG. 1, heads 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor operates under control of internal circuitry 128.

Write circuitry within internal circuitry 128 encodes the data to be stored into successive code words and sends the code words in the form of a serial analog write signal to a write transducer on head 110 which encodes magnetic flux reversals within a magnetic layer on the disc surface. During read operations, the read transducer in head 110 senses the magnetic flux reversals and generates a serial analog read signal. The analog read signal is converted into a serial digital signal, which is provided to detector and decoder circuitry within internal circuitry 128 to produce a recovered data signal as discussed further below.

Figure 2:
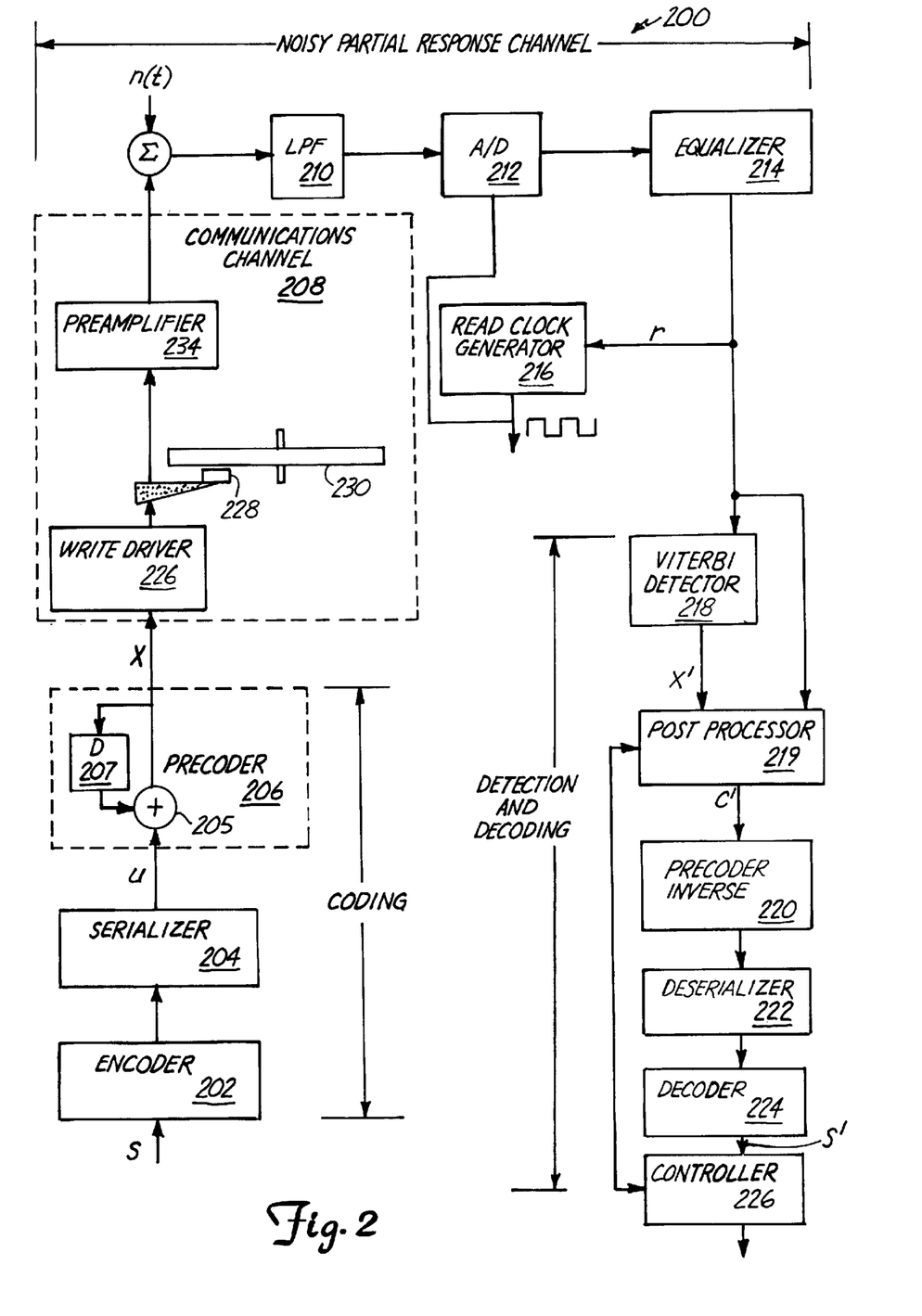
FIG. 2 is a more detailed block diagram of a portion of the data storage system of FIG. 1.

FIG. 2 is a more detailed block diagram of a portion of digital data storage system 100, in which the present invention is used. A succession of user data bytes, S, is provided to an encoder 202, which maps each byte of user data into a corresponding code word. Encoder 202 provides a succession of code words to a serializer 204, which accepts the parallel bits of each of the successive code words and places those bits in a serial sequence, u, which forms the input signal sequence for a precoder 206.

Precoder 206 converts the serial sequence of code words from a non-return to zero inverse (NRZI) format to a non-return to zero (NRZ) format. Under a NRZI format, each "1" represents a transition in a physical property of the recording medium and a "0" represents no transition. Under a NRZ format, a "1" represents one property state for the recording medium and a "0" represents a second property state for the medium. In the embodiment of FIG. 2, precoder 206 performs the conversion by performing an EXCLUSIVE-OR function between a current bit of the sequence of NRZI code word bits and a previous bit in the sequence of NRZ code word bits. This is shown in FIG. 2 with an EXCLUSIVE-OR block 205, which receives the NRZI code bits from serializer 204 and the delayed sequence of NRZ code bits from delay block 207. The output of precoder 206 is a serial NRZ channel input sequence, x.

The precoder output sequence is provided to a communications channel 208, which in the embodiment of FIG. 2 is a write driver 226, a disc 230, a read/write head 228, and a preamplifier 234. Write driver 226 converts the channel input sequence, x, from a voltage signal to a current signal that is suitably scaled for write head 228. Write head 228 uses the current signal to write the channel input sequence to disc 230 by modifying the magnetic moment of localized areas of disc 230. The information is recovered from disc 230 by positioning head 228 near a desired track so that a read signal is generated in head 228 due to the magnetic moments stored on the disc. The read signal is then suitably amplified by pre-amplifier 234 to provide a communications channel output. During the writing and reading process, the respective signals are corrupted by additive wideband noise. This corruption is shown representatively in FIG. 2 by the summing of an ideal communications output signal from pre-amplifier 234 with the a noise signal n(t).

The noisy output signal from communications channel 208 is then filtered and amplified by a low-pass filter 210. The filtered signal is synchronously sampled by an analog-to-digital (A/D) converter 212, in response to a regenerated time reference, or "read clock", produced by a read clock generator 216. The output of sampler 212 is typically a 6 bit binary representation of an instantaneous value of the filtered signal.

The digital samples from (A/D) converter 212 are input to a typically transversal filter, or "equalizer", 214 to produce an equalized channel signal. Within this application, the circuitry from the input of communications channel 208 to the output of equalizer 214 is referred to as a transmission channel to differentiate it from communications channel 208. Equalizer 214 modifies the digital samples so that the overall transfer function of the transmission channel matches a desired channel transfer function, p(D). In terms of an equation, a noiseless output signal, y(D), from equalizer 214 can then be described as:

$$y(D)=P(D)x \qquad \text{EQ. 3}$$

where y(D) is the noiseless component of the equalizer's output signal, x is the input signal provided to communications channel 208 and P(D) is the transfer function of the transmission channel.

Under one embodiment of the present invention, the transmission channel's transfer function provides an EPR4 channel where:

$$P_{EPR4}(D)=1+D-D^2-D^3 \qquad \text{EQ. 4}$$

Combining Equations 3 and 4 and rewriting the result in terms of the ith ideal noiseless output bit, $y_i$, results in:

$$y_i=x_i+x_{i-1}-x_{i-2}-x_{i-3} \qquad \text{EQ. 5}$$

As noted above, the ideal signal is corrupted by additive noise n(t). This additive noise may be represented in the Equation 5 above by adding a term $n_i$. This produces an equation for the actual samples, $r_i$, output by equalizer 214 of:

$$r_i = y_i + n_i \qquad \text{EQ. 6}$$

The resulting signal, $r = \{r_0, r_1, \ldots, r_i, \ldots\}$, is provided to the input of clock generator 216, which uses the signal to regenerate a time clock that is synchronous with the period of the binary data embedded in the resulting signal. The resulting signal is also provided to a detector 218, which in many embodiments is a Viterbi detector. In the embodiment of FIG. 2, detector 218 is a radix-2 Viterbi detector that operates at the sampling rate of A/D converter 212.

From the channel samples, r, the detector determines a maximum likelihood estimate of a binary bit sequence, x', which led to such samples. This estimate represents the most likely values output by precoder 206 given the channel samples.

In one embodiment, detector 218 is an EPR4 detector and equalizer 214 causes the transmission channel's partial response to approach an EPR4 channel. As mentioned above, such EPR4 channels and detectors are susceptible to single-bit errors. In order to detect these errors, the present invention provides a postprocessor 219, which receives the estimate of the binary bit sequence, x', produced by detector 218 as well as the output samples from equalizer 214. Using these input streams, postprocessor 219 identifies single-bit errors in the estimate generated by detector 218 and provides a postprocessor sequence of values, c'. In some embodiments, postprocessor 219 also provides an error flag if it identifies a single-bit error. The operation of postprocessor 219 is discussed further below.

A precoder inverse 220 receives the postprocessor sequence of values produced by postprocessor 219 and performs the inverse operation of the precoding operation of precoder 206. In one embodiment, precoder inverse 220 performs this function by performing an EXCLUSIVE-OR function on the then current bit $c'_i$ and the next previous bit $c'_{i-1}$. This produces an estimated signal, u', which represents an estimate of the signal, u, input to precoder 206.

The output sequence, u', of precoder inverse 220, is converted into parallel blocks, i.e. deserialized, by a deserializer 222. These blocks are then decoded by a decoder 224 to produce an estimate of the user's original data, S'. The estimate of the user's original data S' is then provided to a controller 226, which also receives the error flag, if any, from postprocessor 219. Controller 226 examines the estimate of the user's original data to determine if the data includes any detectable errors. If controller 226 determines that there are errors in the data, it attempts to correct the error. If it cannot correct the error, controller 226 requests that the data be re-read from the disc or indicates to the user that there is an error in the data.

The single-bit errors identified by postprocessor 219 are defined in terms of the difference between a sequence of NRZ values, x, input to the channel and the detected or estimated NRZ sequence, x', produced by detector 218. In terms of an equation:

$$e = x' - x \qquad \text{EQ. 7}$$

Using Equation 7, there can be both +1 and −1 NRZ single-bit error events, with the positive NRZ error event defined as:

$$e = x' - x = \ldots 0000 + 1000000000000 \qquad \text{EQ. 8}$$

and a negative NRZ error event defined as:

$$e = x' - x = \ldots 0000 - 1000000000000 \qquad \text{EQ. 9}$$

where for convenience each error event is defined as occurring at the kth bit.

Postprocessor 219 detects these single-bit error events by using filters designed to emulate an $E^2PR4$ channel. Specifically, postprocessor 219 filters the detected sequence, x', to produce simulated $E^2PR4$ channel samples, z', and filters the output samples, r, from the transmission channel to produce actual $E^2PR4$ channel samples, z. Taking the difference between the simulated and actual $E^2PR4$ channel samples generates a set of $E^2PR4$ error samples. For single-bit error events in the detector, these error samples will contain multi-bit error events. Specifically, for a single-bit error in detector 218, the ideal error samples produced by postprocessor 219 will be, for a positive NRZ single-bit error event:

$$e = z' - z = \ldots 0000120 - 2 - 100000000 \qquad \text{EQ. 10}$$

and for a negative NRZ single-bit error event:

$$e = z' - z = \ldots 0000 - 1 - 202100000000 \qquad \text{EQ. 11}$$

Thus, the error samples of the present invention are easier to detect than the single-bit error events of Equations 8 and 9.

Figure 3:
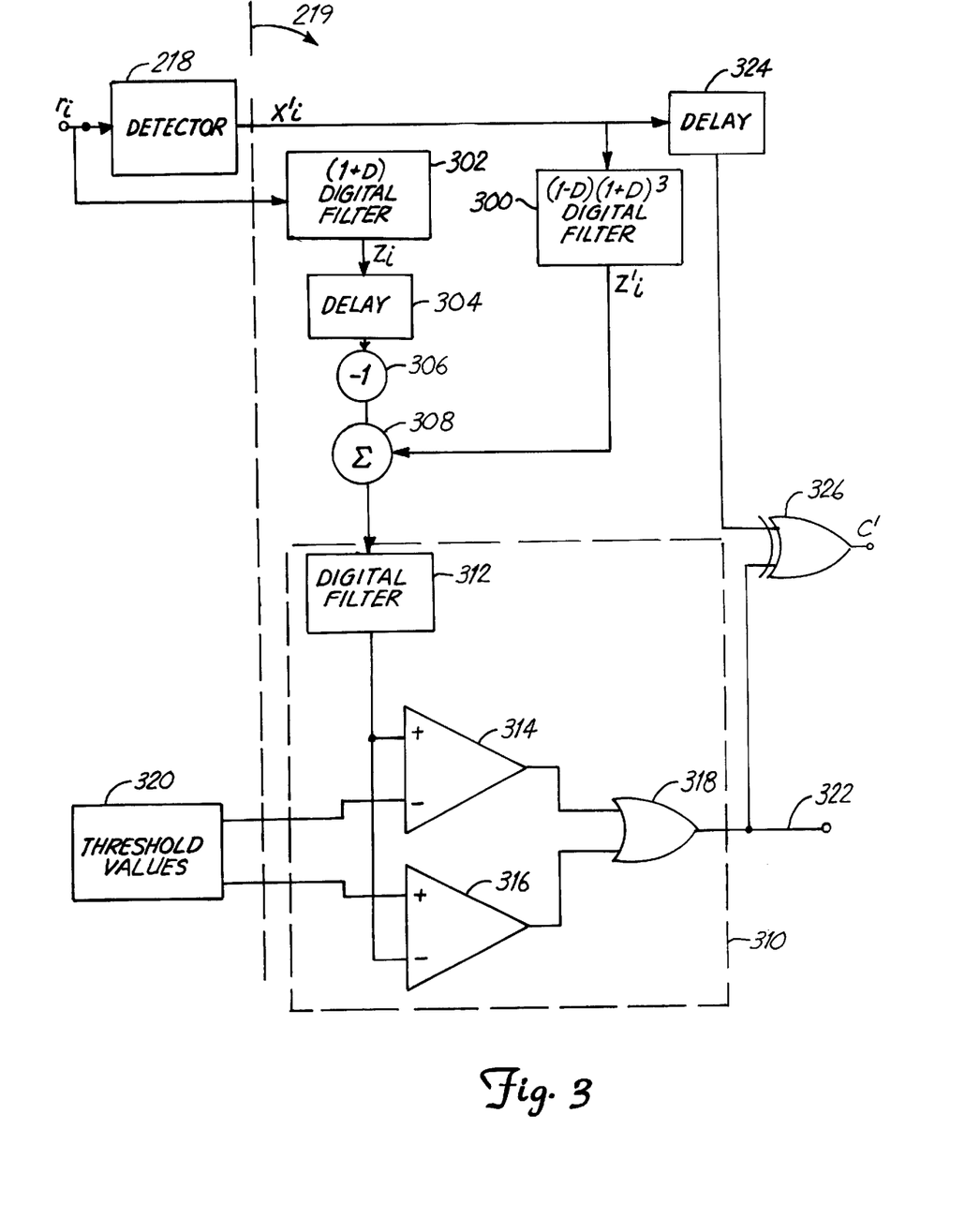
FIG. 3 is a more detailed block diagram of the postprocessor of FIG. 2.

FIG. 3 provides a block diagram of postprocessor 219, showing the elements used to generate the $E^2PR4$ error sequence, z'−z. In FIG. 3, the output of detector 218, x', is provided to an $E^2PR4$ filter 300 capable of performing the function:

$$H_{EEPR4}(D) = 1 + 2D - 2D^3 - D^4 = (1-D)(1+D)^3 \qquad \text{EQ. 12}$$

Passing the detected sequence, x', through this filter produces a sequence of simulated $E^2PR4$ channel values, z'. Since filter 300 simulates an $E^2PR4$ channel, any errors made by detector 218 now appear as errors occurring at the input to a simulated $E^2PR4$ channel.

Postprocessor 219 also includes an equalization filter 302, which receives the channel output sequence, r, and performs a filter function of (1+D) on that sequence. The filter function of equalization filter 302 is chosen so that the combined partial response of the transmission channel and equalization filter 302 is equal to an $E^2PR4$ partial response. In terms of an equation:

$$(1-D)(1+D)^2 \cdot (1+D) = (1-D)(1+D)^3 \qquad \text{EQ. 13}$$

where $(1-D)(1+D)^2$ is the EPR4 response of the transmission channel, $(1+D)$ is the filter function of equalization filter 302, and $(1-D)(1+D)^3$ is the $E^2PR4$ partial response.

The output of equalization filter 302 is a sequence of actual $E^2PR4$ channel samples, z. These are the samples that would have been produced at the transmission channel output if the transmission channel was equalized to an $E^2PR4$ channel.

By subtracting the actual $E^2PR4$ channel samples, z, from the simulated $E^2PR4$ channel samples, z', the postprocessor produces an $E^2PR4$ error sequence. This error sequence simulates the error sequence that would have been created at the output of an $E^2PR4$ channel for an error at the input of an $E^2PR4$ channel. Thus, the present invention simulates the desired $E^2PR4$ error performance without requiring the timing and recovery circuits associated with an $E^2PR4$ channel.

To subtract the actual $E^2PR4$ channel samples, z, from the simulated $E^2PR4$ channel samples, z', postprocessor 219 first delays the actual E²PR4 channel samples, z, using a delay 304 so that the actual samples and the simulated samples are aligned. This delay is necessary because of the delay inherent in detector 218. Once the samples are aligned, postprocessor 219 changes the sign of each of the actual samples, $z_i$, using a circuit 306. This allows the actual samples, $z_i$, to be subtracted from the simulated samples, $z'_i$, using a simple summing circuit 308.

To determine if a single-bit error is present in the detected sequence, x', the difference sequence generated by summing circuit 308 is passed through a verification circuit 310. In the embodiment of FIG. 3, verification circuit 310 includes a matched filter 312, two comparators 314 and 316, and an OR gate 318.

Matched filter 312 is designed to maximize the signal-to-noise ratio for a difference sequence, z'–z, that was generated by a single-bit error event in detector 218. The optimal filter is a matched filter having a transfer function in the frequency domain that is the complex conjugate of the Fourier transform of the difference sequence output by summing circuit 308. The Fourier transform of the difference sequence sampled at the bit rate of detector 218 is given by:

$$E_{EEPR4}=(+/-1)[1+2e^{-j\omega}-2e^{-j\omega 3}-e^{-j\omega 4}] \quad \text{EQ. 14}$$

where ω is the sampling frequency. The complex conjugate of this transform is obtained by changing the sign of each exponent resulting in:

$$MF_{EEPR4}=(+/-1)[1+2e^{j\omega}-2e^{j\omega 3}-e^{j\omega 4}] \quad \text{EQ. 15}$$

or:

$$MF_{EEPR4} = (+/-1)\left[1 + \frac{2}{e^{-j\omega}} - \frac{2}{e^{j\omega 3}} - \frac{1}{e^{-j\omega 4}}\right] \quad \text{EQ. 16}$$

which can be rewritten as:

$$MF_{EEPR4} = (+/-1)\frac{1}{e^{-j\omega 4}}[e^{-j\omega 4} + 2e^{-j\omega 3} - 2e^{-j\omega} - 1] \quad \text{EQ. 17}$$

The term $$\frac{1}{e^{-j\omega 4}}$$

is a delay that affects all values in the sequence equally. Therefore, the term can be ignored. Using the D transform of $D=e^{-j\omega}$ and this simplification, Equation 17 can be rewritten as:

$$MF(D)_{EEPR4}=(+/-1)[_D{}^4+2D^3-2D-1] \quad \text{EQ. 18}$$

Figure 4:
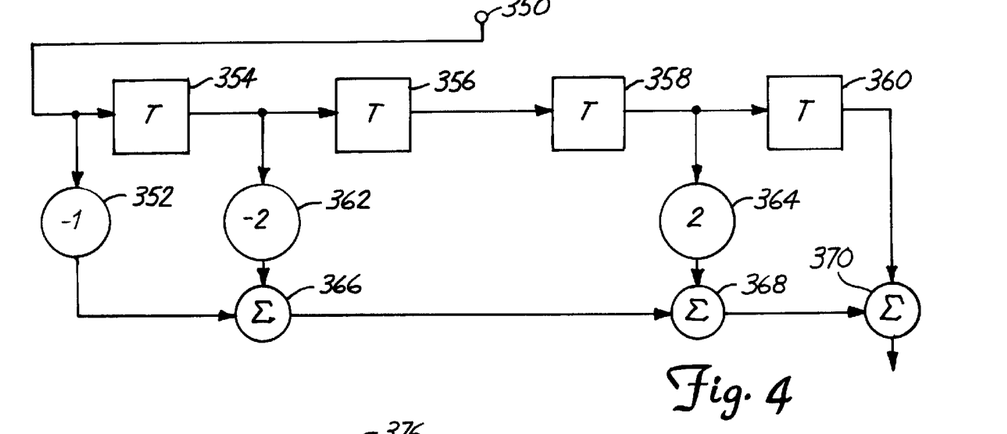
FIG. 4 is a more detailed block diagram of one embodiment of a matched filter of the present invention.

In one embodiment, a matched filter with the transform function of Equation 18 is implemented using a collection of summing circuits, delay circuits, and multipliers as shown in FIG. 4. Binary values at the output of summing circuit 308 of FIG. 3 are provided to an input 350, which is connected to a delay circuit 354. Delay circuit 354 delays each value on input 350 by one sampling period T so that the output of delay circuit 354 is the previous value of input 350. The output of delay circuit 354 is connected to two more delay circuits 356 and 358, which are in series with each other. Together, delay circuits 356 and 358 provided a delay of two more sampling periods such that the output of delay circuit 358 is the value that was on input 350 three sampling periods before the current value on input 350. A fourth delay circuit 360 is connected to the output of delay circuit 358 and provides the 4th previous value of input 350.

Input 350 and the outputs of delay circuits 354 and 358 are each connected to respective multipliers 352, 362, and 364, which multiply the values on those outputs by respective weighting factors of –1, –2, and 2. The values on the outputs of these multipliers and the value on the output of delay circuit 360 are then summed together by a series of summing circuits 366, 368, and 370. Specifically, summing circuit 366 sums the output values of multipliers 352 and 354, summing circuit 368 sums the output values of summing circuit 366 and multiplier 364, and summing circuit 370 sums the output values of summing circuit 368 and delay circuit 360. The output of summing circuit 370 represents the matched filter's output.

An alternative configuration for matched digital filter 312 can be obtained by manipulating the transfer function set out in Equation 18 above. In particular, the sum $D^2-D^2$ having a net value of zero can be added to the transfer function of Equation 18 to produce:

$$D^4+2D^3+D^2-D^2-2D-1 \quad \text{EQ. 19}$$

which can then be written as:

$$D^2(D^2+2D+1)-(D^2+2D+1) \quad \text{EQ. 20}$$

to give the result:

$$(D^2-1)(D^2+2D+1). \quad \text{EQ. 21}$$

This result can be written alternatively as $$(D^2-1)(1+D)^2 \quad \text{EQ. 22}$$

or $$(D-1)(1+D)^3 \quad \text{EQ. 23}$$

Figure 5:
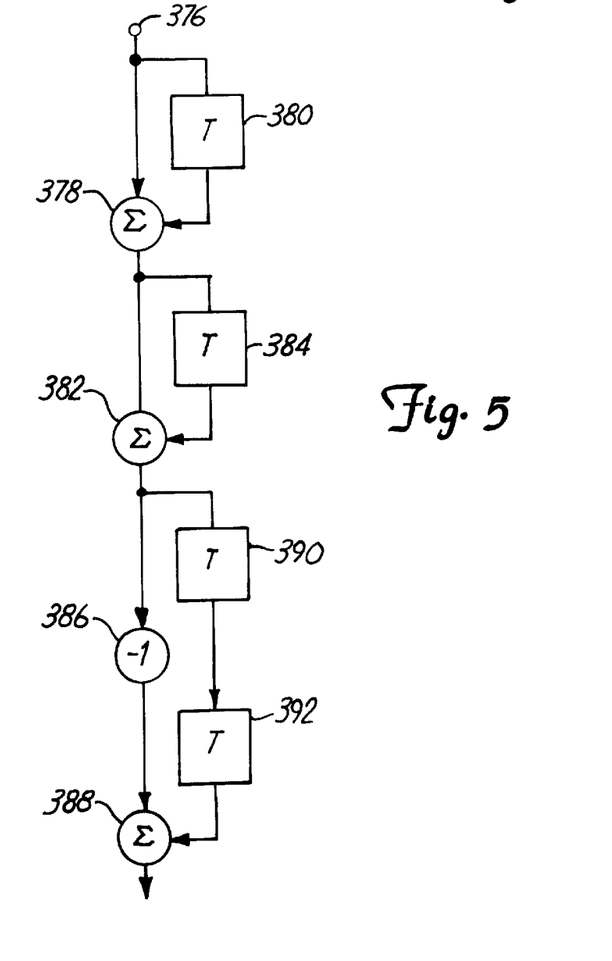
FIG. 5 is a more detailed block diagram of a second embodiment of a matched filter of the present invention.

FIG. 5 shows an implementation of a matched filter in accordance with equation 22. In FIG. 5, a first summing circuit 378 combines a current binary value on input 376 with a preceding binary value from delay unit 380. The result of summing circuit 378 is provided to a summing circuit 382 and a single sampling period delay unit 384. The output of delay unit 384 is also provided to summing circuit 382 so that summing circuit 382 sums the current output of summing circuit 378 with the previous output of summing circuit 378.

The sign of the sum from summing circuit 382 is changed by a circuit 386 and the result is provided to a summing circuit 388. Summing circuit 388 also receives the sum generated by summing circuit 382 during the second previous sampling period. This second previous sum is provided by two delay units 390 and 392 connected in series. Summing circuit 388 then sums the twice-delayed sum from delay unit 392 and the negated sum from circuit 386. The output of summing circuit 388 is the output of the matched filter.

Figure 6:
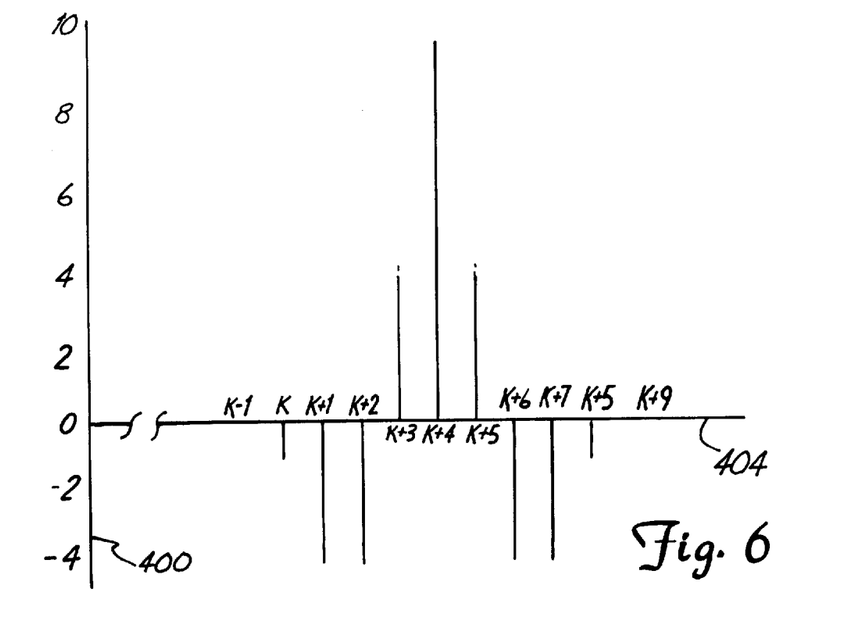
FIG. 6 is a graph of filtered difference values generated for a positive single-bit error.
Figure 7:
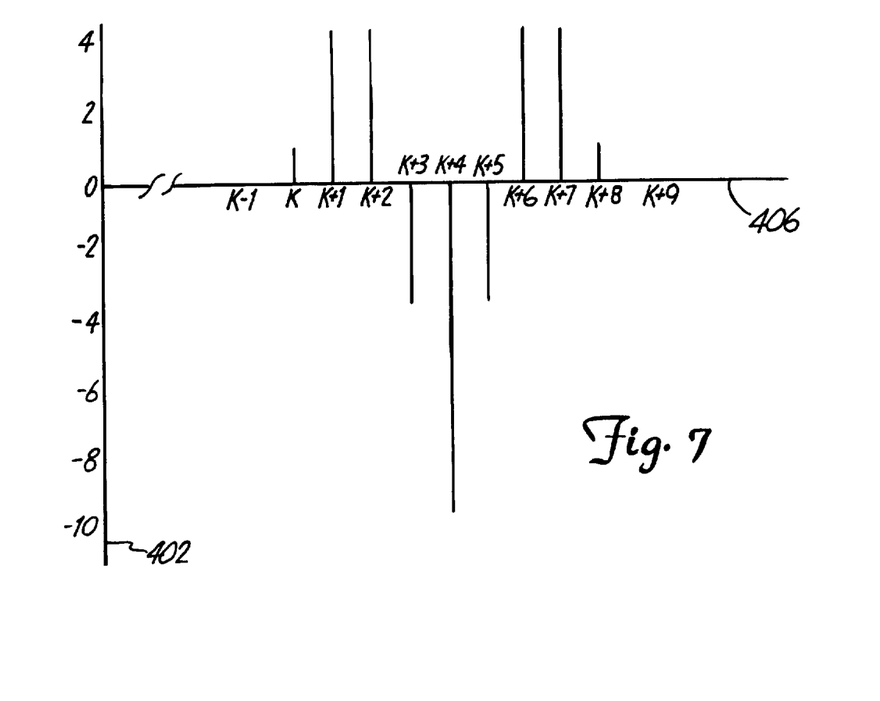
FIG. 7 is a graph of filtered difference values generated for a negative single-bit error.

As discussed above, when a single-bit error event occurs in detector 218, an E²PR4 error sequence is generated at the output of summing circuit 308 of FIG. 3. The form of these error sequences is shown above in Equations 10 and 11. When these error sequences are passed through a matched filter having the transform function of Equation 18, such as the filters of FIGS. 4 and 5, the output of the matched filter is:

$$(z'-z)MF(D)_{EEPR4}=\ldots 0000-1-4-44104-4-4-10000 \quad \text{EQ. 24}$$

for a positive single-bit error and:

$$(z'-z)MF(D)_{EEPR4} = \ldots 0000144\text{-}4\text{-}10\text{-}44410000 \ldots \quad \text{EQ. 25}$$

for a negative single-bit error. These results are shown graphically in FIGS. 6 and 7, where FIG. 6 represents a positive single-bit error and FIG. 7 represents a negative single-bit error. In FIGS. 6 and 7, vertical axes 400 and 402, respectively, represent the output values from matched filter 312 and horizontal axes 404 and 406, respectively, show time in terms of the kth bit, which marks the beginning of the single-bit error event.

The response displayed in FIGS. 6 and 7 is used by verification circuit 310 to determine when a single-bit error occurs. Specifically, verification circuit 310 includes comparators 314 and 316 that are used to identify the matched filter's peak output values of +10 and −10, respectively. In one embodiment, this is achieved by applying a threshold 320 of +5 and −5 to the inputs of comparators 314 and 316, respectively. The values of +5 and −5 are chosen because they are one-half the minimum distance ($d^2=10$) of the $E^2PR4$ channel. If the output of the matched filter exceeds +5, the output of comparator 314 changes to 1, and if the output of the matched filter is lower than −5, the output of comparator 316 changes to 1.

The outputs of comparators 314 and 316 are provided as input to OR gate 318 such that if either comparator's output has a value of 1, the output of OR gate 318 is 1. Thus, the output of OR gate 318 will be 1 whenever a single-bit error event occurs in the detected sequence generated by detector 218. Thus, the output of OR gate 318 can be utilized as an error flag 322, which may be provided to controller 226 of FIG. 2.

In some embodiments, the output of OR gate 318 is also used to correct the detected sequence generated by detector 218. By inserting a proper delay circuit 324, the detected sequence is delayed so that the kth bit of the detected sequence is aligned with the "k+4"th bit in the matched filter's output. The output of OR gate 318 is then combined with the delayed sequence using an EXCLUSIVE-OR gate 326. When a single-bit error occurs at the kth bit, the "k+4"th bit of the matched filter's output exceeds the set thresholds for at least one of the comparators and the output of OR-gate 318 becomes 1. When this occurs, EXCLUSIVE-OR gate 326 generates the compliment of the kth bit in the detected sequence. If the kth bit is not a single-bit error, the output of OR- gate 318 remains at zero, and EXCLUSIVE-OR gate 326 simply generates the kth bit of the detected sequence. Thus, the output of EXCLUSIVE-OR gate 326 is a corrected sequence of values, c'.

In summary, a method is provided for identifying errors in a detected sequence of values, x', that are determined from first channel samples, r, obtained at an output of a signal transmission channel, 208, 210, 212, and 214 and equalized to a first channel response characteristic (Equation 1). The detected sequence, x', are generated by a detector 218 designed for a channel with the first channel response characteristic (Equation 1). The detected sequence, x', is filtered using a filter 300 capable of emulating a second channel response characteristic (Equation 2). This produces a sequence of simulated second channel samples z'. The first channel samples, r, are also filtered by using a filter 302 that is capable of emulating a response characteristic (1+D) that is equal to the second channel response characteristic (Equation 2) divided by the first channel response characteristic (Equation 1). This produces a sequence of actual second channel samples, z.

A sequence of difference values is then generated by taking the difference between each value, z', of the sequence of simulated second channel samples, z', and a corresponding value, $z_i$, of the sequence of actual second channel samples. This sequence of difference values is then used to identify at least one error in the detected sequence of values, x'.

In one embodiment, identifying at least one error in the detected sequence, x', involves filtering the sequence of difference values using a filter 312 matched to an expected error. The filtering produces a filtered sequence of difference values. Each value in the filtered sequence is then compared, 314, 316 to a threshold value 320 to identify at least one error in the detected sequence of values.

An apparatus 218, 219 is also provided for detecting sequence of values, c', from a first channel output of a first channel, 208, 210, 212, and 214. The apparatus includes a detector 218 capable of detecting a preliminary sequence of values, x', based on samples, r, taken from the first channel output. A second channel filter 300 is coupled to the detector 218 and is capable of generating a sequence of simulated second channel samples, z', from the preliminary sequence of values, x'. An equalizer filter 302 is coupled to the first channel output and is capable of generating a sequence of actual second channel samples, z, from the samples, r, taken from the first channel output. Equalizer filter 302 has a partial response characteristic (1+D) such that the combined partial response characteristics of the first channel (Equation 1) and equalizer filter 302 (1+D) is equal to the response characteristic of second channel filter 300 (Equation 2).

A difference circuit 306, 308 is capable of generating a sequence of difference values by taking the difference between each sample in the sequence of simulated second channel samples, z', and a corresponding sample in the sequence of actual second channel samples, z. The sequence of difference values is used by a verification circuit 312, 314, 316, 318, and 320 to identify errors in the preliminary sequence of values, x'.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the detector and postprocessor while maintaining substantially the same functionality without departing from the scope and spirit of the present invention. In addition, although the preferred embodiment described herein is directed to a detector and postprocessor for a disc drive system, it will be appreciated by those skilled in the art that the teachings of the present invention can be applied to other systems, like tape-drive, internet, or intranet systems, or other communications systems without departing from the scope and spirit of the present invention.

What is claimed is:

1. A method for identifying errors in a detected sequence of values that are determined from first channel samples obtained at an output of a signal transmission channel equalized to a first channel response characteristic, the method comprising steps of:
   (a) generating the detected sequence of values from the first channel samples using a detector designed for a channel with a first channel response characteristic;
   (b) filtering the detected sequence of values using a filter capable of emulating a second channel response characteristic to produce a sequence of simulated second channel samples;

(c) filtering the first channel samples using a filter capable of emulating a response characteristic that is equal to the second channel response characteristic divided by the first channel response characteristic, the filtering producing a sequence of actual second channel samples;

(d) generating a sequence of difference values, each difference value based on the difference between a corresponding simulated second channel sample and a corresponding actual second channel sample; and (e) identifying at least one error in the detected sequence of values based on the sequence of difference values.

2. The method of claim 1 wherein step (a) comprises using a detector designed for a channel with an EPR4 characteristic of $(1-D)(1+D)^2$.

3. The method of claim 2 wherein step (b) comprises using a filter capable of emulating an $E^2PR4$ channel of $(1-D)(1+D)^3$ to produce a sequence of simulated second channel samples.

4. The method of claim 1 wherein step (e) of identifying at least one error in the detected sequence of values comprises:

(i) filtering the sequence of difference values using a filter matched to an expected error, the filtering producing a filtered sequence of difference values; and (ii) comparing each value of the filtered sequence of difference values to a threshold value to identify at least one error in the detected sequence of values.

5. The method of claim 4 wherein the step (e)(i) of filtering the sequence of difference values comprises using a filter matched to an expected single-bit error occurring between a sequence of values at the input to the signal transmission channel and the detected sequence of values.

6. The method of claim 5 wherein the step (e)(i) of filtering the sequence of difference values comprises using a filter comprising a collection of delays, summing circuits and multipliers for implementing the function $D^4+2D^3-2D-1$ where $D^4$ represents a delay of four sampling time units, $D^3$ represents a delay of three sampling time units, and D represents a delay of one sampling time unit.

7. The method of claim 6 wherein the step(e)(i) of filtering the sequence of difference values comprises using a series of three filters capable of implementing three respective functions, $(1+D)$, $(1+D)$, and $(D^2-1)$.

8. The method of claim 1 further comprising a step of (f) correcting values in the detected sequence of values that are determined to be in error.

9. The method of claim 1 further comprising a step of (g) providing an output indication for each error identified in step (e).

10. An apparatus for detecting sequences of values from samples taken from a first channel output of a first channel, the apparatus comprising:

a detector capable of detecting a preliminary sequence of values from samples taken from the first channel output;

a second channel filter coupled to the detector and capable of generating a sequence of simulated second channel samples from the preliminary sequence of values;

an equalizer filter coupled to the first channel output and capable of generating a sequence of actual second channel samples from samples taken from the first channel output, the equalizer filter having a partial response characteristic such that the combined partial response characteristic of the first channel and the equalizer filter is equal to the response characteristic of the second channel filter;

a difference circuit capable of generating a sequence of difference values by taking the difference between each sample in the sequence of simulated second channel samples and a corresponding sample in the sequence of actual second channel samples; and a verification circuit for identifying errors in the preliminary sequence of values based on the sequence of difference values.

11. The apparatus of claim 10 wherein the verification circuit comprises a matched filter that is matched to an expected error in the preliminary sequence of values and is capable of filtering the sequence of difference values to produce a filtered sequence of difference values.

12. The apparatus of claim 11 wherein the matched filter is capable of performing a filtering function of the form $D^4+2D^3-2D-1$ where $D^4$ represents a delay of four time units, $D^3$ represents a delay of three time units, and D represents a delay of one time unit.

13. The apparatus of claim 12 wherein the matched filter comprises:

a present value multiplier circuit coupled to the difference circuit and capable of multiplying a present value in the sequence of difference values by negative one;

a primary delay circuit coupled to the difference circuit and capable of producing a previous value representing the difference value that was immediately previous to the present value in the sequence of difference values;

a previous value multiplier, coupled to the primary delay circuit and capable of multiplying the previous value by negative two;

a secondary delay circuit coupled to the primary delay circuit and capable of producing a tertiary difference value, the tertiary difference value being previous to the present value and separated from the present value by two intervening values in the sequence of difference values;

a tertiary value multiplier coupled to the secondary delay circuit and capable of multiplying the tertiary difference value by positive two;

a tertiary delay circuit coupled to the secondary delay circuit and capable of producing a quaternary difference value, the quaternary difference value being immediately previous to the tertiary difference value in the sequence of difference values; and a summing circuit coupled to the tertiary delay circuit, the present value multiplier, the previous value multiplier and the tertiary value multiplier and capable of summing the quaternary difference value with the output values from the present value multiplier, the previous value multiplier and the tertiary value multiplier to produce a present filtered value in the filtered sequence of difference values.

14. The apparatus of claim 12 wherein the matched filter comprises a series of three filter circuits capable of performing respective filter functions of $(1+D)$, $(1+D)$, and $(D^2-1)$.

15. The apparatus of claim 14 wherein the matched filter comprises:

a first delay circuit coupled to the difference circuit and capable of delaying the sequence of difference values from the difference circuit by one time unit to produce a sequence of delayed values;

a first summing circuit coupled to the difference circuit and the first delay circuit and capable of summing each value in the sequence of delayed values with a corresponding value from the sequence of difference values to produce a sequence of first sum values;

a second delay circuit coupled to the first summing circuit and capable of delaying the sequence of first sum values by one time unit to produce a sequence of delayed first sum values;

a second summing circuit coupled to the first summing circuit and the second delay circuit and capable of summing each value in the sequence of delayed first sum values with a corresponding value from the sequence of first sum values to produce a sequence of second sum values;

a third delay circuit coupled to the second summing circuit and capable of delaying the sequence of second sum values by two time units to produce a sequence of delayed second sum values; and a subtraction circuit coupled to the second summing circuit and the third delay circuit and capable of subtracting each value from the sequence of second sum values from a corresponding value in the sequence of delayed second sum values to produce the filtered sequence of difference values.

16. The apparatus of claim 11 wherein the verification circuit further comprises a comparison circuit capable of comparing each value in the filtered sequence of difference values with at least one threshold value and of providing an output indicative of whether the magnitude of a value from the filtered sequence of difference values exceeds the magnitude of a threshold value.

17. The apparatus of claim 16 wherein the comparison circuit comprises one comparator capable of comparing each value in the filtered sequence of difference values with a positive threshold value and a second comparator capable of comparing each value in the filtered sequence of difference values with a negative threshold value.

18. The apparatus of claim 10 further comprising an error correction circuit capable of changing a value in the preliminary sequence of values if the verification circuit identifies the value as being in error.

19. The apparatus of claim 18 wherein the error correction circuit comprises a delay circuit coupled to the detector and an EXCLUSIVE-OR gate coupled to the verification circuit and the delay circuit.

20. The apparatus of claim 10 wherein the apparatus forms part of a disk drive storage system.

21. A disc drive storage system comprising:

a write circuit, write head, disc, read head, and equalizer circuit forming a transmission channel with a channel response characteristic; and detector means for detecting a sequence of values at the output of the transmission channel such that an error is identified in a preliminary sequence of values by utilizing an additional channel response characteristic that is different from the channel response characteristic of the transmission channel.

* * * * *